United States Patent
Chang et al.

(10) Patent No.: US 8,908,084 B2
(45) Date of Patent: Dec. 9, 2014

(54) ELECTRONIC DEVICE AND METHOD FOR FOCUSING AND MEASURING POINTS OF OBJECTS

(71) Applicants: Chih-Kuang Chang, New Taipei (TW); Li Jiang, Shenzhen (CN); Zhong-Kui Yuan, Shenzhen (CN); Xiao-Guang Xue, Shenzhen (CN); Dong-Hai Li, Shenzhen (CN)

(72) Inventors: Chih-Kuang Chang, New Taipei (TW); Li Jiang, Shenzhen (CN); Zhong-Kui Yuan, Shenzhen (CN); Xiao-Guang Xue, Shenzhen (CN); Dong-Hai Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 120 days.

(21) Appl. No.: 13/663,578

(22) Filed: Oct. 30, 2012

(65) Prior Publication Data
US 2013/0155313 A1   Jun. 20, 2013

(30) Foreign Application Priority Data
Dec. 14, 2011   (CN) .......................... 2011 1 0416986

(51) Int. Cl.
*G03B 13/00* (2006.01)
*H04N 5/232* (2006.01)

(52) U.S. Cl.
USPC ........... 348/345; 348/239; 348/344; 348/370; 348/374

(58) Field of Classification Search
CPC ...... G01B 11/00; G01B 11/03; G01B 11/023; G02B 21/0024; G02B 21/006; G02B 21/008
USPC .......................... 348/239, 344, 370, 374, 345
See application file for complete search history.

(56) References Cited

U.S. PATENT DOCUMENTS

| | | | |
|---|---|---|---|
| 6,205,636 B1 * | 3/2001 | Abe et al. ..................... | 29/407.1 |
| 2003/0193560 A1 * | 10/2003 | Oh et al. ......................... | 348/87 |
| 2009/0137988 A1 * | 5/2009 | Kurtz .............................. | 606/4 |
| 2010/0053403 A1 * | 3/2010 | Chang et al. .................. | 348/311 |

* cited by examiner

*Primary Examiner* — Antoinette Spinks
(74) *Attorney, Agent, or Firm* — Novak Druce Connolly Bove + Quigg LLP

(57) ABSTRACT

In an electronic device, an image point A on an image of an object is selected. A spectral confocal sensor is controlled to move to a position above a measuring point A' on the object, where the measuring point A' corresponds to the image point A, and a Z-coordinate of the measuring point A' is computed using the spectral confocal sensor. A focal position of the measuring point A' is computed according to the Z-coordinate of the measuring point A', and a CCD lens is controlled to move to the focal position. The Z-coordinate of the measuring point A' is stored into a storage unit of the electronic device.

12 Claims, 4 Drawing Sheets

ELECTRONIC DEVICE AND METHOD FOR FOCUSING AND MEASURING POINTS OF OBJECTS

BACKGROUND

1. Technical Field

The present disclosure generally relates to image measuring technology, more particularly to an electronic device and a method for focusing and measuring points of an object.

2. Description of Related Art

Image measuring is widely used in precision measurement field for precision, accuracy, and speed. When measuring objects using an image measuring method, a charged coupled device (CCD) lens is used for focusing the objects and capturing images of the objects. The images captured by the CCD lens are then transmitted to an electronic device, such as a computer, and a measuring program installed in the electronic device measures the objects using the images.

However, in the existing image measuring method, if users want to measure different points of the objects and use the CCD lens to focus on each of the points on the objects, the focusing operations may be time-consuming while accuracy is very low.

DETAILED DESCRIPTION

In general, the word "module" as used hereinafter, refers to logic embodied in hardware or firmware, or to a collection of software instructions, written in a programming language. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable medium or other computer storage device.

Figure 1:
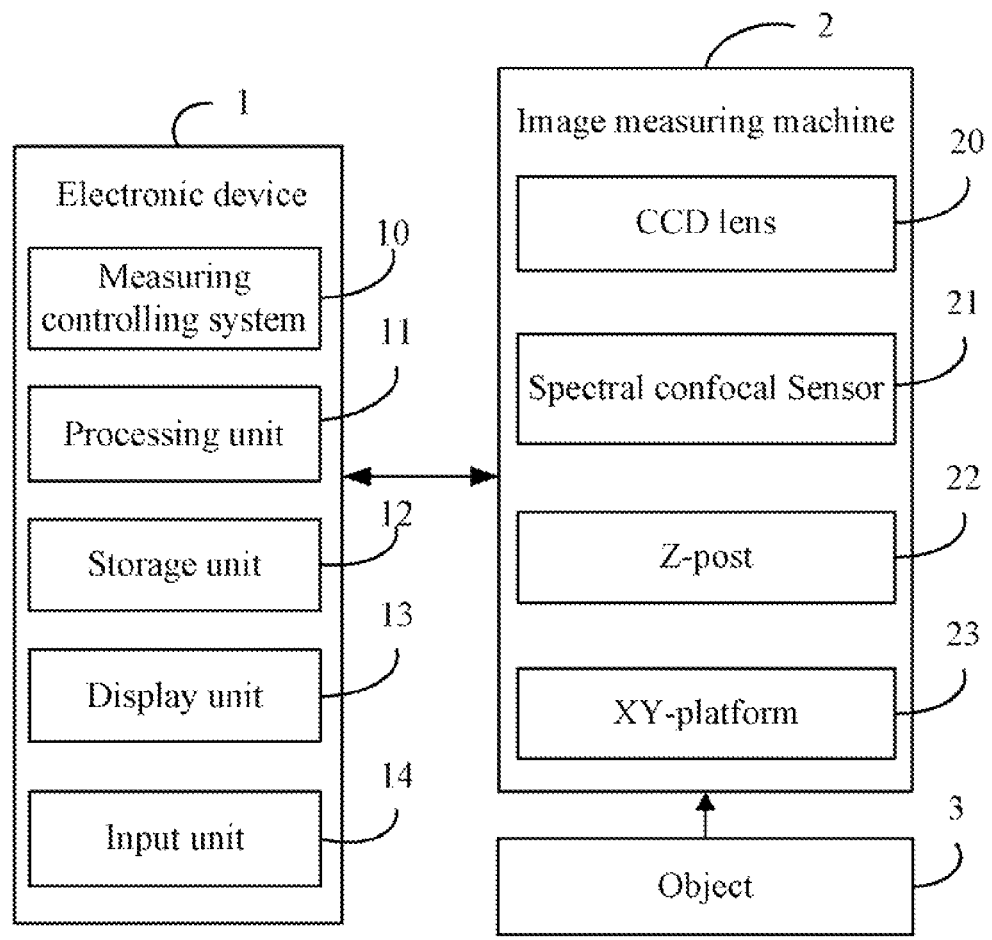
FIG. 1 is a block diagram of one embodiment of an electronic device including a measuring controlling system.

FIG. 1 is a block diagram of one embodiment of an electronic device 1. The electronic device 1 may be a computer, a server, or a personal digital assistant (PDA), for example. The electronic device 1, which is electronically connected to an image measuring machine 2, includes a measuring controlling system 10, a processing unit 11, a storage unit 12, a display unit 13, and an input unit 14. The measuring controlling system 10 controls the image measuring machine 2 to focus on points, lines, and planes of an object 3 for measuring Z-coordinates of the points, the lines, and the planes.

The measuring controlling system 10 includes a number of function modules (depicted in FIG. 2). which include computerized code in the form of one or more programs. The computerized code of the function modules is stored in the storage unit 12 and capable of being executed by the processing unit 11 to provide the aforementioned functions of the measuring controlling system 10.

One skilled in the art would recognize that the electronic device 1 may further include other or different components.

The processing unit 11 may include a processor, a microprocessor, an application-specific integrated circuit (ASIC), and a field programmable gate array, (FPGA) for example. The storage unit 12 may include different type(s) of computer-readable storage medium, such as a hard disk drive, a compact disc, a digital video disc, or a tape drive. The display unit 13 may be a LCD screen, and the input unit 14 may be a mouse or a stylus.

The image measuring machine 2 includes a CCD lens 20, a spectral confocal sensor 21, a Z-post 22 and an XY-platform 23. The CCD lens 20 and the spectral confocal sensor 21 are positioned at the Z-post 22, and the CCD lens 20 is movable along the Z-post 22. The Z-post 22 is perpendicular to the XY-platform 23 and is movable along an X-axis direction and a Y-axis direction of a mechanical coordinate system of the image measuring machine 2. The object 3 is placed on the XY-platform 23.

The CCD lens 20 captures images of the object 3, and transmits the images to the electronic device 1. The spectral confocal sensor 21 is used for acquiring measuring points on the object 3, and computing Z-coordinates of the measuring points. The spectral confocal sensor 21 emits a beam of white light (polychromatic). The white light is refracted and reveals beams of homogeneous light after passing through the spectral confocal sensor 21. Each beam of the homogeneous light has a single wavelength. The Z-coordinates of the measuring points on the object 3 are computed according to the wavelengths of the homogeneous light.

Figure 2:
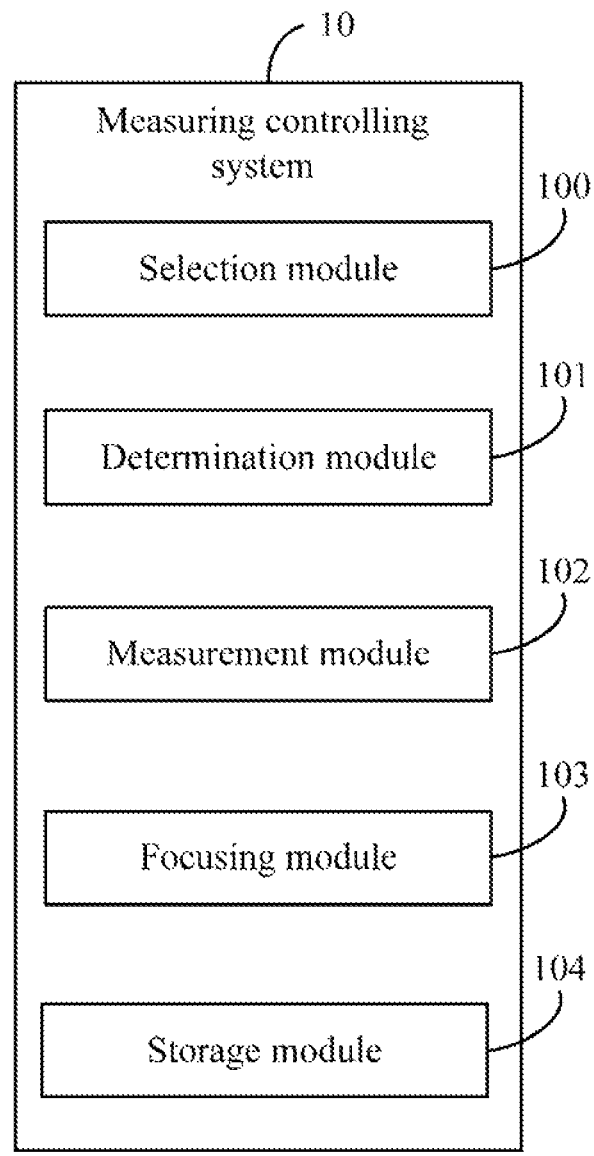
FIG. 2 is a block diagram of one embodiment of function modules of the measuring controlling system in FIG. 1.

FIG. 2 is a block diagram of one embodiment of the function modules of the measuring controlling system 10. In one embodiment, the measuring controlling system 10 may include a selection module 100, a determination module 101, a measurement module 102, a focusing module 103, and a storage module 104. The function modules 100-104 provide at least the functions needed to execute the steps illustrated in FIGS. 3A and 3B.

Figure 3A:
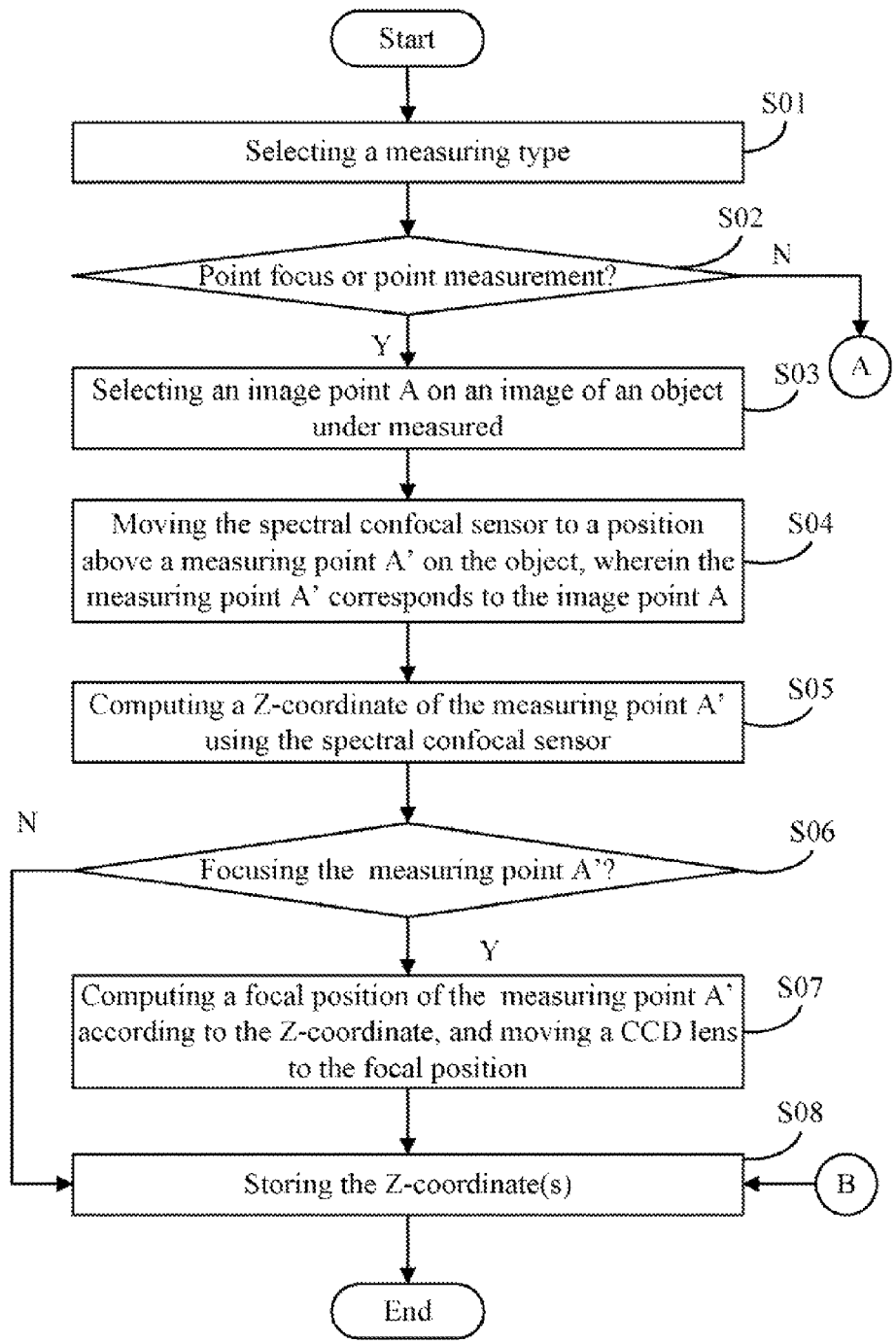
FIG. 3A-3B illustrate a flowchart of one embodiment of a method for focusing and measuring points of an object.
Figure 3B:
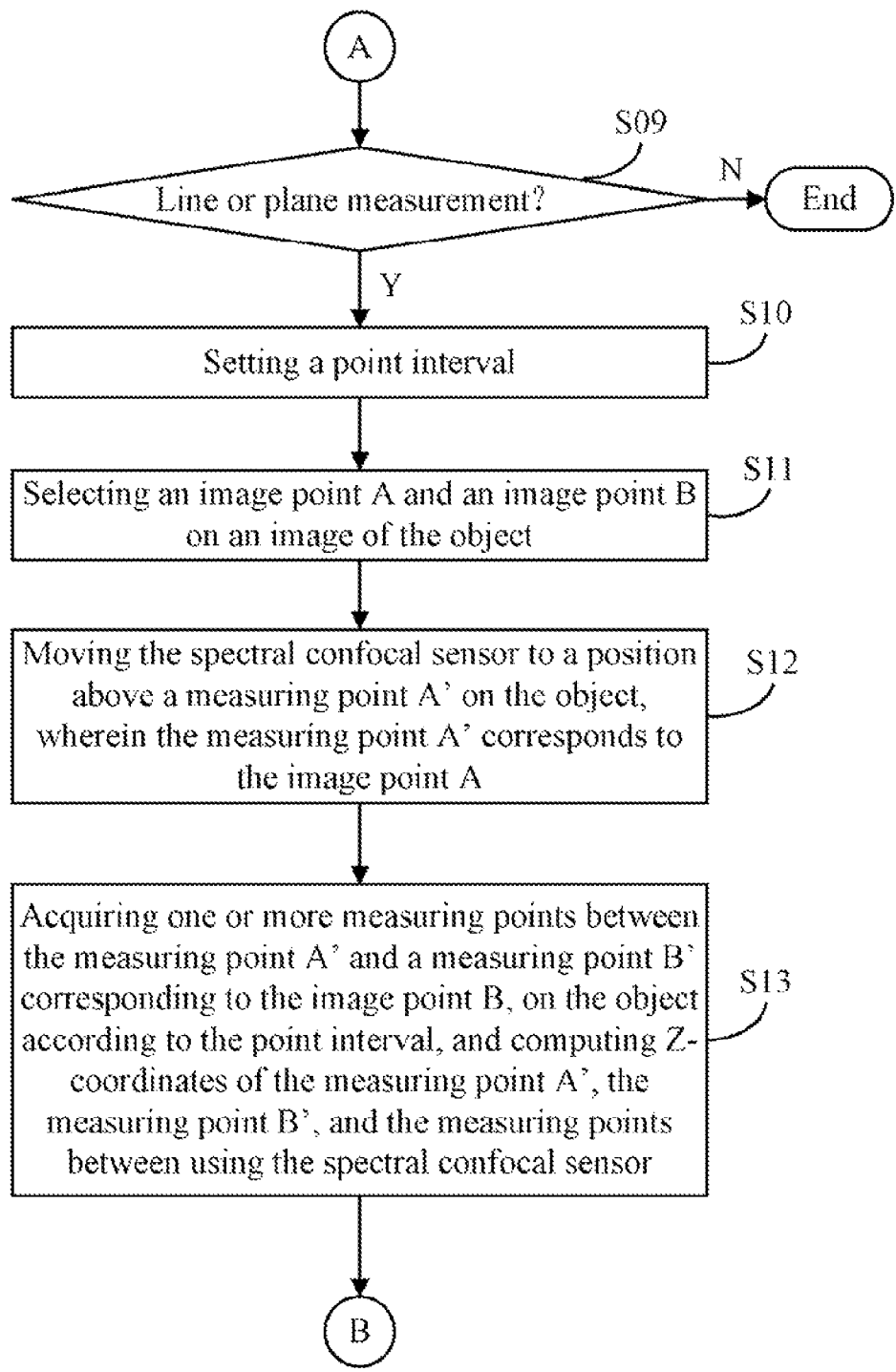

FIGS. 3A and 3B illustrate a flowchart of one embodiment of a method for focusing on points of the object 3 and measuring the points. Depending on the embodiment, additional steps may be added, others removed, and the ordering of the steps may be changed.

In step S01, the selection module 100 selects a measuring type. In one embodiment, the measuring type may be point focus, point measurement, line measurement, or plane measurement.

In step S02, the determination module 101 determines if the measuring type is point focus or point measurement according to the selection module 100. If the measuring type is point focus or point measurement, step S03 is implemented. If the measuring type is not focus or point measurement, then step S09 in FIG. 3B is implemented.

In step S03, the measurement module 102 selects an image point A on an image of the object 3. The selection is controlled by a user. The image is captured by the CCD lens 20 and displayed on the display unit 13 of the electronic device 1. The user uses the input unit 14 to control the measurement module 102 to select the image point A through the display unit 13.

In step S04, the measurement module 102 controls the spectral confocal sensor 21 to move to a position above a measuring point A' on the object 3, wherein the measuring point A' corresponds to the image point A. The position above the measuring point A' has the same X-coordinate and Y-coordinate, but a different Z-coordinate from the measuring point A'.

In step S05, the measurement module 103 controls the spectral confocal sensor 21 to compute a Z-coordinate of the measuring point A'. As mentioned above, the spectral confocal sensor 21 emits a beam of white light which is refracted revealing homogeneous lights after passing through the spectral confocal sensor 21. The homogeneous lights then focus at different positions of a central axis of the spectral confocal sensor 21 due to different waveforms of the homogeneous lights. When one of the homogeneous lights focuses at the measuring point A' of the object 3, the homogeneous light is reflected to the spectral confocal sensor 21. The spectral confocal sensor 21 computes the Z-coordinate of the measuring point A' according to the particular waveform of the reflected homogeneous light.

In step S06, the focusing module 103 determines if the measuring point A' needs to be focused. In one embodiment, when the measuring type is point focus, the focusing module 103 determines that the measuring point A' needs to be focused, then step S07 is implemented. In another embodiment, when the measuring type is point measurement, then the focusing module 103 determines that the measuring point A' does not need to be focused, and step S08 is directly implemented.

In step S07, the focusing module 103 computes a focal position of the measuring point A' according to the Z-coordinate of the measuring point A', and controls the CCD lens 20 to move to the focal position. In one embodiment, the focal position is computed by adding the Z-coordinate of the measuring point A' to a known focal distance of the CCD lens 20.

In step S08, the storage module 104 stores the Z-coordinate of the measuring point A' into the storage unit 12.

In step S09 (FIG. 3B), the determination module 101 determines if the measuring type is line measurement or plane measurement according to the selection module 100. If the measuring type is either line measurement or plane measurement, step S10 is implemented. If the measuring type is neither line measurement nor plane measurement, the process ends.

In step S10, the measurement module 101 sets at least one point interval. The point interval is a distance between each two measuring points on the object 3. When the measuring type is line measurement, the measurement module 101 sets a single point interval, and when the measuring type is plane measurement, the measurement module sets multiple point intervals, where one of the multiple point intervals is transverse, and another of the multiple point intervals is longitudinal.

In step S11, the measurement module 101 selects an image point A and an image point B on an image of the object 3. As mentioned, the image is captured by the CCD lens 20 and displayed on the display unit 13 of the electronic device 1.

In step S12, the measurement module 102 controls the spectral confocal sensor 21 to move to a position above a measuring point A' on the object 3, where the measuring point A' corresponds to the image point A. As mentioned above, the position above the measuring point A' has the same X-coordinate and Y-coordinate, but a different Z-coordinate from the measuring point A'.

In step S13, the measurement module 102 acquires one or more measuring points between the measuring point A' and a measuring point B', where the measuring point B' corresponds to the image point B, on the object 3, according to the at least one point interval, and computes Z-coordinates of the measuring point A', the measuring point B', and the measuring points in between using the spectral confocal sensor 21. After step S13, step S08 depicted above is implemented to store the Z-coordinates of the measuring point A', the measuring point B', and the measuring points between the measuring point A' and the measuring point B'.

The above-described embodiments of the present disclosure, including any particular embodiments, are merely possible examples of implementations, set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure is protected by the following claims.

What is claimed is:

1. A computerized method for focusing and measuring points of an object, the method being executed by at least one processor of an electronic device and comprising:
    selecting an image point A on an image of the object using an input unit of the electronic device, wherein the image is displayed on an display unit of the electronic device;
    controlling a spectral confocal sensor to move to a position above a measuring point A' on the object, and to compute a Z-coordinate of the measuring point A' using the spectral confocal sensor, wherein the measuring point A' corresponds to the image point A;
    computing a focal position of the measuring point A' according to the Z-coordinate of the measuring point A', and controlling a CCD lens to move to the focal position, wherein the focal position is computed by adding the Z-coordinate of the measuring point to a focal distance of the CCD lens; and
    storing the Z-coordinate of the measuring point A' into a storage unit of the electronic device.

2. The method according to claim 1, further comprising:
    setting a measuring type which comprises focus, point measurement, line measurement, and plane measurement.

3. The method according to claim 2, when the measuring type is line measurement or plane measurement, the method further comprising:
    setting at least one point interval;
    selecting a measuring image point B on the image of the object;
    acquiring one or more measuring points between the measuring point A' and a measuring point B' on the object according to the at least one point interval, wherein the measuring point B' corresponds to the image point B;
    computing Z-coordinates of the measuring point A', the measuring point B', and the measuring points between the measuring points A' and B' using the spectral confocal sensor; and
    storing the Z-coordinates of the measuring point A', the measuring point B', and the measuring points between the measuring points A' and B'.

4. The method according to claim 3, wherein only one point interval is set when the measuring type is line measurement and two point intervals are set when the measuring type is plane measurement.

5. An electronic device, comprising:
    an input unit;
    a display unit;
    a non-transitory storage medium;
    at least one processor; and
    one or more modules that are stored in the non-transitory storage medium; and are executed by the at least one processor, the one or more modules comprising instructions to:
    select an image point A on an image of the object using the input unit, wherein the image is display on the display unit;

control a spectral confocal sensor to move to a position above a measuring point A' on the object and to compute a Z-coordinate of the measuring point A' using the spectral confocal sensor, wherein the measuring point A' corresponds to the image point A;

compute a focal position of the measuring point A' according to the Z-coordinate of the measuring point A', and controlling a CCD lens to move to the focal position, wherein the focal position is computed by adding the Z-coordinate of the measuring point to a focal distance of the CCD lens; and store the Z-coordinate of the measuring point A' into a storage unit of the electronic device.

6. The electronic device according to claim 5, wherein the one or more modules further comprises instructions to:

set a measuring type which comprises focus, point measurement, line measurement, and plane measurement.

7. The electronic device according to claim 6, when the measuring type is line measurement or plane measurement, the one or more modules further comprising instructions to:

set at least one point interval;

select a measuring image point B on the image of the object;

acquire one or more measuring points between the measuring point A' and a measuring point B' on the object according to the at least one point interval, wherein the measuring point B' corresponds to the image point B;

compute Z-coordinates of the measuring point A', the measuring point B', and the measuring points between measuring points A' and B' using the spectral confocal sensor; and store the Z-coordinates of the measuring point A', the measuring point B', and the measuring points between measuring points A' and B'.

8. The electronic device according to claim 7, wherein only one point interval is set when the measuring type is line measurement and two point intervals are set when the measuring type is plane measurement.

9. A non-transitory storage medium having stored thereon instructions that, when executed by a processor of an electronic device, causes the processor to perform a method for focusing and measuring points of an object, comprising:

selecting an image point A on an image of the object using an input unit of the electronic device, wherein the image is display on an display unit of the electronic device;

controlling a spectral confocal sensor to move to a position above a measuring point A' on the object and to compute a Z-coordinate of the measuring point A' using the spectral confocal sensor, wherein the measuring point A' corresponds to the image point A;

computing a focal position of the measuring point A' according to the Z-coordinate of the measuring point A', and controlling a CCD lens to move to the focal position, wherein the focal position is computed by adding the Z-coordinate of the measuring point to a focal distance of the CCD lens; and storing the Z-coordinate of the measuring point A' into a storage unit of the electronic device.

10. The non-transitory storage medium according to claim 9, wherein the method further comprising:

setting a measuring type which comprises focus, point measurement, line measurement, and plane measurement.

11. The non-transitory storage medium according to claim 10, when the measuring type is line measurement or plane measurement, the method further comprising:

setting at least one point interval;

selecting a measuring image point B on the image of the object;

acquiring one or more measuring points between the measuring point A' and a measuring point B' on the object according to the at least one point interval, wherein the measuring point B' corresponds to the image point B;

computing Z-coordinates of the measuring point A', the measuring point B', and the measuring points between the measuring points A' and B' using the spectral confocal sensor; and storing the Z-coordinates of the measuring point A', the measuring point B', and the measuring points between the measuring points A' and B'.

12. The non-transitory storage medium according to claim 11, wherein only one point interval is set when the measuring type is line measurement and two point intervals are set when the measuring type is plane measurement.

* * * * *